United States Patent
Yoo

Patent Number: 5,892,594
Date of Patent: Apr. 6, 1999

[54] MULTIPAGE DOCUMENT COPYING TECHNIQUE FOR FACSIMILE MACHINE

[75] Inventor: Hyun-Chang Yoo, Seoul, Rep. of Korea

[73] Assignee: SamSung Electronics Co., Ltd., Suwon, Rep. of Korea

[21] Appl. No.: 855,722

[22] Filed: May 8, 1997

[30] Foreign Application Priority Data

May 8, 1996 [KR] Rep. of Korea ............... 1996/15092
Mar. 31, 1997 [KR] Rep. of Korea ............... 1997/11663

[51] Int. Cl.$^6$ .................... H04N 1/04; B65H 3/44
[52] U.S. Cl. .................. 358/498; 358/496; 358/296; 271/9.02
[58] Field of Search .................. 358/498, 496, 358/441, 413, 468, 474, 437; 399/17, 16, 371, 361, 363; 271/3.14, 3.17, 9.02; 355/408

[56] References Cited

U.S. PATENT DOCUMENTS

| | | | |
|---|---|---|---|
| 4,427,287 | 1/1984 | Matsumoto et al. | 399/17 |
| 4,564,792 | 1/1986 | Fukushi | 318/254 |
| 4,663,722 | 5/1987 | Sato | 364/478.01 |
| 5,010,364 | 4/1991 | Maekawa et al. | 399/17 |
| 5,040,074 | 8/1991 | Stemmle | 358/296 |
| 5,060,080 | 10/1991 | Hwang | 358/401 |
| 5,140,446 | 8/1992 | Kim | 358/498 |
| 5,194,970 | 3/1993 | Iwanade | 358/498 |
| 5,216,526 | 6/1993 | Ju | 358/498 |
| 5,239,395 | 8/1993 | Kang et al. | 358/498 |
| 5,379,128 | 1/1995 | Ishida et al. | 358/449 |
| 5,513,017 | 4/1996 | Knodt et al. | 358/471 |
| 5,534,973 | 7/1996 | Harada | 399/1 |
| 5,555,349 | 9/1996 | Miyasaka et al. | 395/111 |
| 5,589,953 | 12/1996 | Tazawa et al. | 358/498 |
| 5,663,804 | 9/1997 | Kataoka et al. | 358/304 |

*Primary Examiner*—Edward L. Coles
*Assistant Examiner*—Mong Le Chin
*Attorney, Agent, or Firm*—Robert E. Bushnell, Esq.

[57] ABSTRACT

In a technique for copying a multipage document, a document feed roller and a paper feed roller are started when a document to be copied is sensed, so that image information is scanned by a scanner and copied onto sheets of paper. After this operation, a determination is made as to whether or not the next sheet of the multipage document exists. If so, the copying operation continues, but the paper feed roller stops while the document feed roller continues to be driven if the transporting distance is greater than a predetermined distance.

6 Claims, 10 Drawing Sheets

MULTIPAGE DOCUMENT COPYING TECHNIQUE FOR FACSIMILE MACHINE

CLAIM OF PRIORITY

This application makes reference to, incorporates the same herein, and claims all benefits accruing under 35 U.S.C. §119 from an application for MULTIPAGE DOCUMENT COPYING METHOD FOR FACSIMILE earlier filed in the Korean industrial Property Office on the 8th day of May 1996 and there duly assigned Ser. No. 15092/1996, a copy of which application is annexed hereto and for MULTIPAGE DOCUMENT COPYING METHOD FOR FACSIMILE earlier filed in the Korean Industrial Property Office on the 31 day of Mar. 1997 and there duly assigned Ser. No. 11663/1997, a copy of which applications is annexed hereto

BACKGROUND OF THE INVENTION

1. Field of the Invention

The present invention relates to a facsimile machine and more particularly, to a technique for copying a multipage document in a facsimile machine.

2. Description of the Related Art

Generally speaking, a facsimile machine divides a still image, such as characters, photographs and pictures, into picture elements through scanning, and converts them into electrical signals for the purpose of transmission. In addition to this operation, the facsimile machine performs reception in which the original image transmitted is realized, after receiving the electrical signals transmitted from a long distance. Such a facsimile machine which performs transmission and reception typically has at least a document feed roller for transporting a document, a scanner for scanning image information written on the document transported by the document feed roller, a paper feed roller for transporting sheets of paper for printing the image information read by the scanner, and a CPU for controlling their operations.

Advanced facsjmile machines perform a copying operation as well as transmission and reception so that users may have additional convenient functions. For instance, Korean Utlity Model Application No 95-28546 filed by the Applicant and entitled Motor Driving Apparatus For Facsimile, discloses a facsimile which performs a copying operation as well as transmission and reception. The facsimile machine's document copying procedure is divided into two parts: transporting the document to be copied to the scanning position, and transporting sheets of paper to copy the transported document. These operations can be applied even to the case of copying a multipage document. More specifically, during multipage document copying, the facsimile machine copies the first page of the document, and then controls the gear mode to the transmission mode in order to copy the second page of the document so that the document is transported to the scanning position. After this procedure, the facsimile machine returns the gear mode to the copying mode so that the second page of the document is transported to the copying position to be copied the transported copy paper. Then, the facsimile machine repeats the above-explained operations in order to copy the third page of the document.

Most of the facsimile machines comprising the document feed roller and paper feed roller, including the facsimile machine disclosed in the aforesaid Utility Model Application, take long time to copy a document. This is because of the fact that, during multipage copying, the facsimile machine must transport the document to be copied after the gear mode is switched to the transmission mode from the copying mode, and then the gear mode must be switched to the copying mode for copying. Specifically, during multipage copying, the facsimile machine takes time to switch from the copying mode to transmission mode, time to transport the document in the document transmission mode, and time to switch from the transmission mode to the copying mode. It takes longer time to copy as the number of documents increases.

The following patents each disclose features in common with the present invention but do not teach or suggest the specifically recited technique for copying a multi-page documents in a facsimile machine in accordance with the present invention.

U.S. Pat. No. 5,589,953 to Tazawa et al., entitled Image Input System Having An Auto-Feeder Including Loading Magazine And Discharge Magazine Arranged Side By Side And Method, U.S. Pat. No. 5,555,349 to Miyasaka et al, entitled Printing Device And Recording Paper Control, U.S. Pat. No. 5,534,973 to Harada, entitled Automatic Document Feeder For Photocopier And Facsimile Device, U.S. Pat. No. 5,513,017 to Knodt et al., entitled Automatic document Imaging Mode Selection System, U.S Pat. No. 5,379,128 to Ishida et al., entitled Document Transport Apparatus And Method, U.S. Pat. No. 5,239,395 to Kang et al., entitled Transmission/Copy Method And Device For A Two-Way Scanning Facsimile, U.S. Pat. No. 5,216,526 to Ju, entitled Method For Controlling Paper-Feeding By Detecting A Starting Point Of Scanning In A Facsimile System, U.S Pat. No. 5,194,970 to Iwanade, entitled Automatic Original Feeding Device, U.S. Pat. No. 5,060,080 to Hwang, entitled Self Multi-Copy Method In A Facsimile System, and U.S. Pat. No. 4,663,122 to Sato, entitled Automatic Paper Feed Control Apparatus For A Painting Device.

SUMMARY OF THE INVENTION

An object of the present invention is to provide a technique for reducing the time needed to copy a multi-page document in a facsimile machine.

Another object of the present invention is to provide a technique for copying a multipage document without a change of gear mode in a facsimile machine.

Still another object of the present invention is to provide a technique for handling a document which is jammed while it is being copied in a facsimile machine.

To accomplish the objects of the present invention in a technique for copying a multipage document, a document feed roller and a paper feed roller are started when a document to be copied is sensed, so that image information is scanned by the scanner and copied onto sheets of paper. After this operation, a determination is made as to whether or not the next sheet of the multipage document exists. If so, the copying operation continues, but the paper feed roller stops while the document feedroller continues to be driven if the transporting distance is greater than a predetermined distance.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Hereinafter, a preferred embodiment of the present invention will be described with reference to the attached drawings. In the drawings, regions or portions of the same structure and function have been labeled with the same or similar reference numerals for easy understanding. However, related well-known functions or constructions will not be explained in detail, in order not to make the gist of the present invention vague. The later-mentioned terms are defined in consideration with the functions of the present invention so that they should be based upon the overall contents of the specification.

Figure 1:
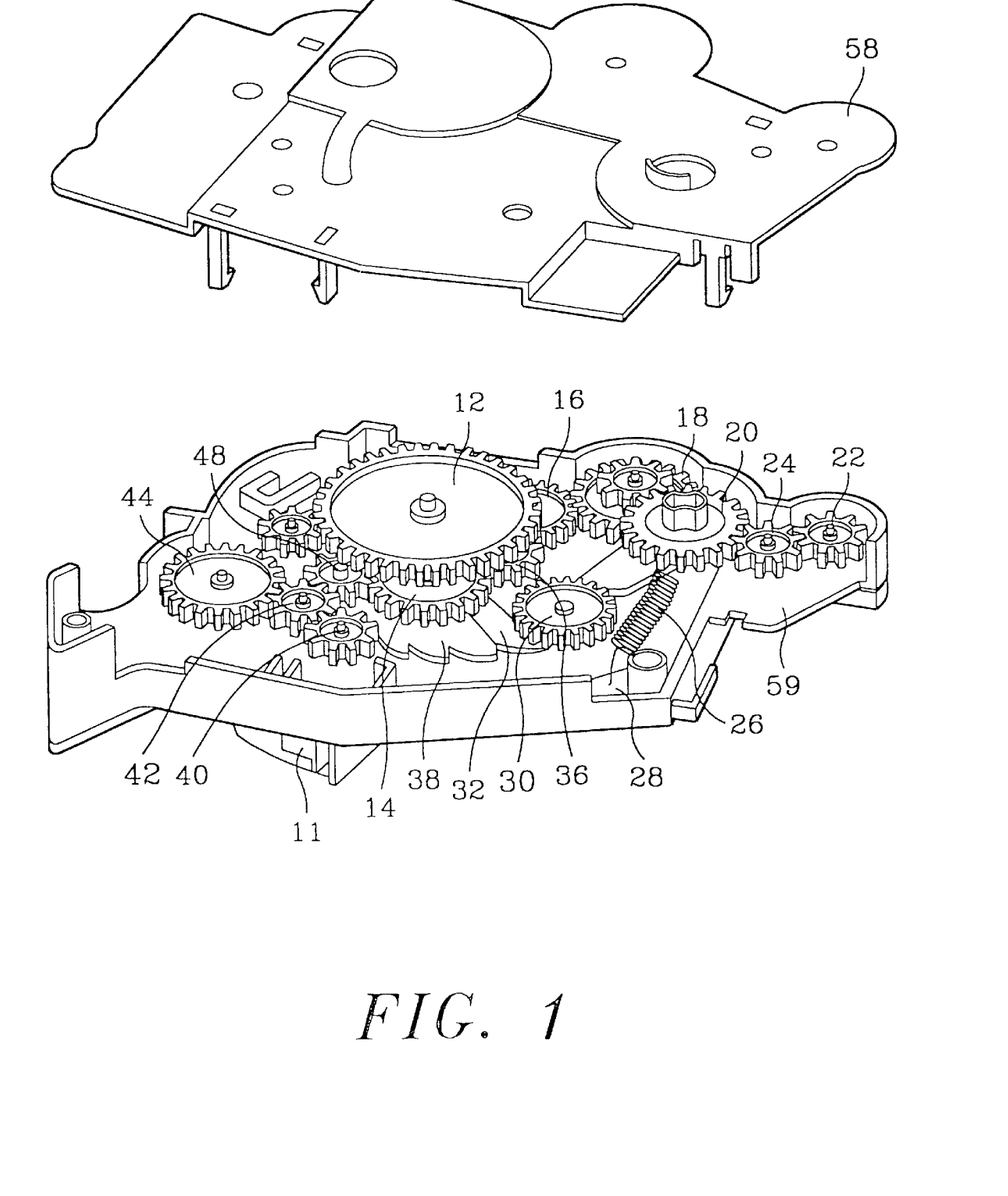
FIG. 1 shows the interior construction of a facsimile machine having a single motor, to which the present invention is applied.
Figure 2:
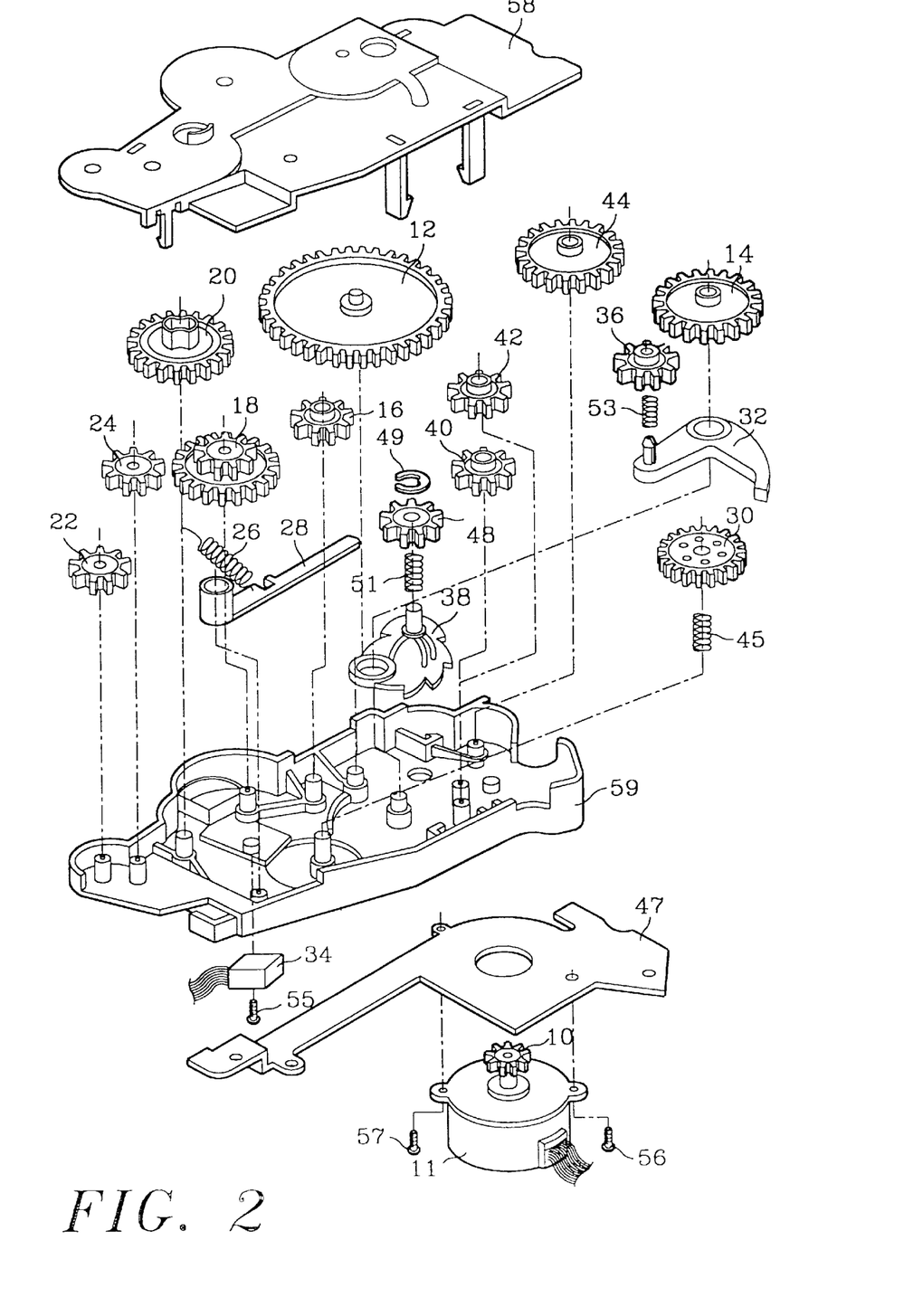
FIG. 2 is an exploded perspective of the facsimile machine shown in FIG. 1.

First of all, a preferred embodiment of the present invention is described as applied to a facsimile machine constructed as in FIGS. 1 and 2. FIG. 1 shows the construction of the facsimile machine disclosed in the above-mentioned Utility Model Application, FIG. 2 being an exploded perspective view thereof. It should be noted, however, that the present invention can be applied to a facsimile machine including at least a document feed roller (transmission roller) and paper feed roller (reception roller), as well as to the facsimile machine shown in FIGS. 1 and 2.

The multipage document copying operation of the present invention is as follows. After the first page of the document is copied, the second page is transported while the facsimile machine's gear mode is not changed to the document transmission mode, that is, when the facsimile machine is maintained in the document copying mode. In this state, when the document is transported, it is conveyed together with the copy paper . When the document is transported to the scanning position, the copy paper is also transported as far as the distance between the first and second pages of the document. Since the distance between pages is constant in multipage document copying, the margin of the waiting paper transported together with the second page after the first page has been copied can be used as the margin between the pages. If the second page is moved over a predetermined distance (designated as the margin between pages of the copy paper) when the distance to transport the second page of the document is calculated in the copying mode, the conveyance of the document in the copying mode is stopped, and the gear mode is changed to the document transmission mode to perform document conveyance.

Prior to specifically describing the multipage document copying operation according to the present invention, the copying mode and transmission mode disclosed in the previously cited Korean Utility Model Application 95-28546 entitled Motor Driving Apparatus For Facsimile, will be stated.

Figure 3:
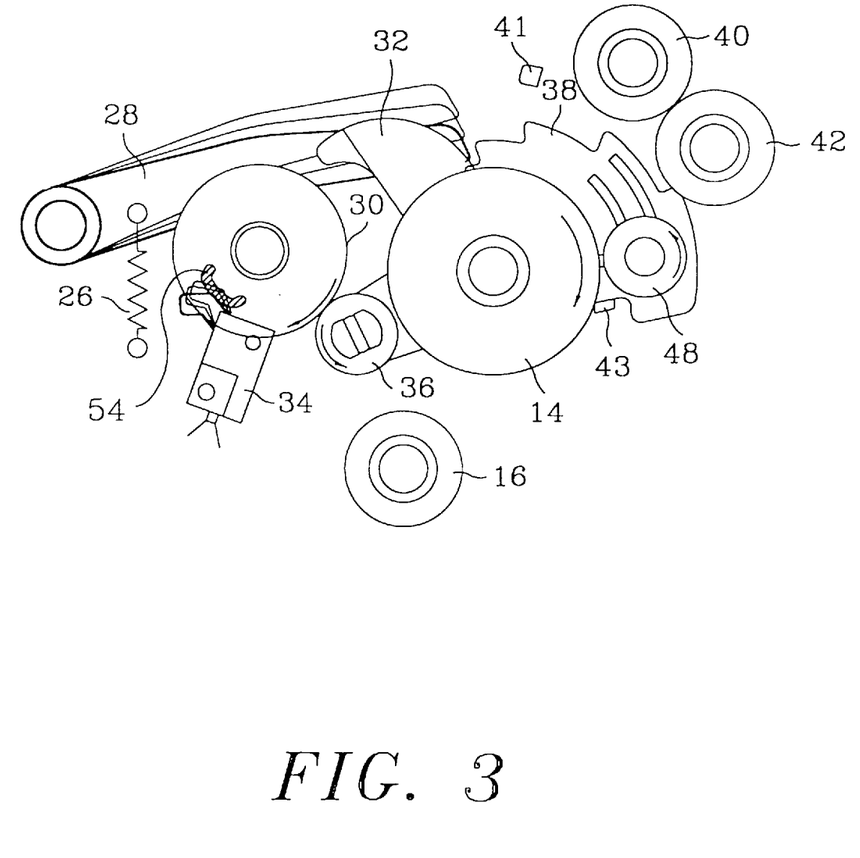
FIG. 3 shows a state in which as the facsimile machine's cam gear rotates, the rotation state of the peripheral gears is changed.
Figure 4:
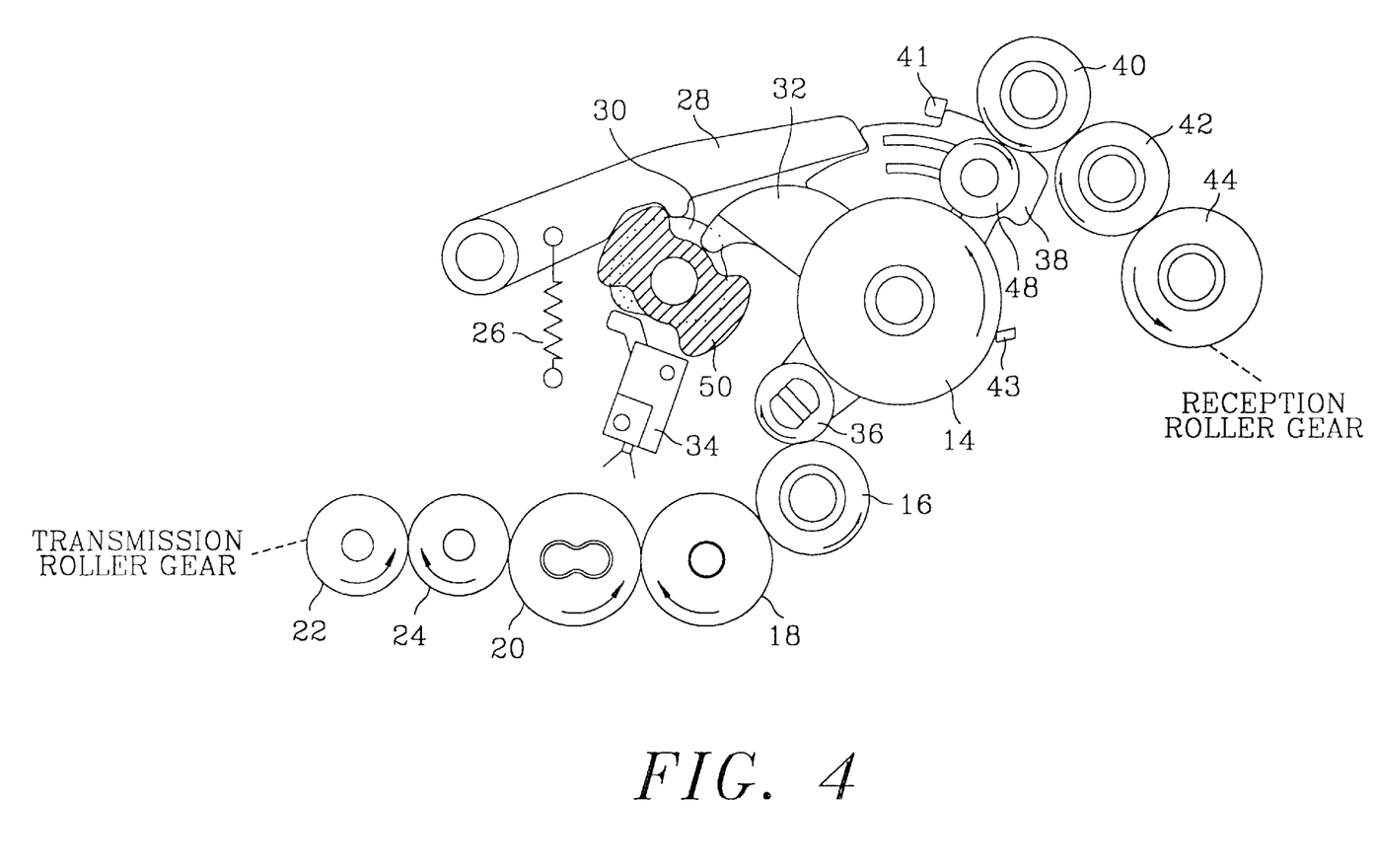
FIG. 4 shows the rotation states of various gears in the document copying mode of the facsimile machine shown in FIG. 1.
Figure 5:
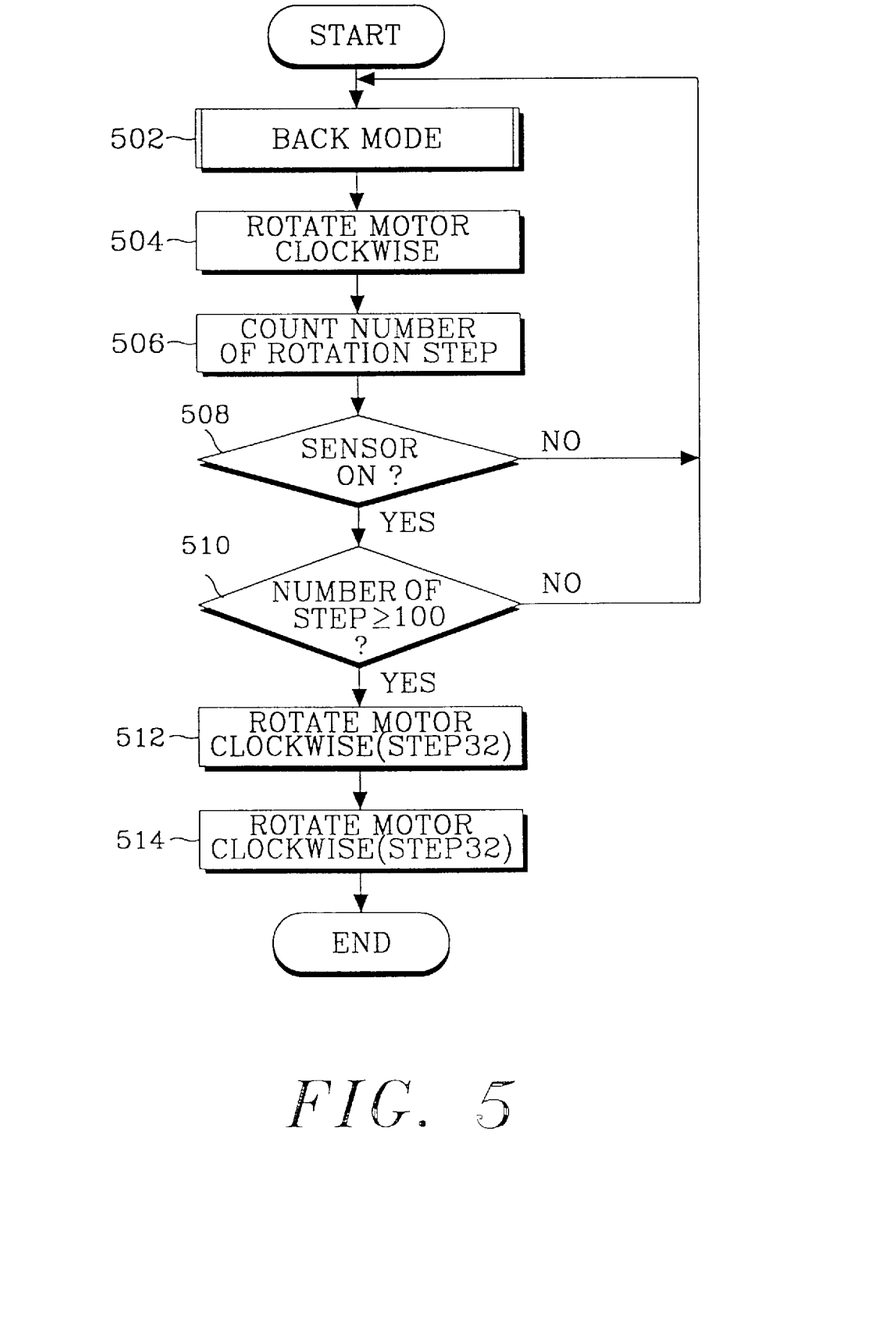
FIG. 5 is a flowchart of the document copying mode of operation of the facsimile machine shown in FIG. 1.

FIGS. 3 and 4 show that various gears of the facsimile machine are driven in a mode in which the transmission roller and reception roller are driven together in the document copying operation. FIG. 5 is a flowchart illustrating the process through which the various gears of the facsimile machine are driven as shown in FIGS. 3 and 4.

Referring to FIGS. 1, 2 and 3, a driving gear 10 rotates clockwise by the driving force of a step motor 11 at the initial stage of document copying operation in the facsimile machine, and a first gear 12 rotates counterclockwise by the driving gear 10. A central gear 14 rotates clockwise by a first gear 12 as in FIG. 3, and counterclockwise as shown in FIG. 4. A first reciprocating gear 36 rotates clockwise to interlock a cam gear 30, and then immediately stops and rotates counterclockwise. The cam gear 30 rotates clockwise by a first reciprocating gear 36. A sensor cam 54 installed at the lower end of the cam gear 30 rotates so that a sensor 34 determines the initial location of the cam gear 30 as shows in FIG. 3. Other gears are fixed as shown in FIG. 4.

Elements 58 and 59 in FIG. 1 are two halves of a frame which supports the various other gears and mechanical elements of the facsimile machine. Futhermore, element 26 in FIG. 1, as well as elements 45, 51, and 53 of FIG. 2 are springs.

Element 49 in FIG. 2 is a spring retainer clip whereas element 32 is a pivoting cam element.

Elements 55–57 of FIG. 2 are mounting screws and element 47 is a mounting plate for mounting the motor thereon.

Element 41 of FIG. 3 is a mechanical stop or stopping the movement of element 38 as noted in FIG. 4.

Referring to FIGS. 4 and 5, the central gear 14 rotates counterclockwise by the reverse (counterclose) rotation of the driving gear 10. A second gear 16 rotates counterclockwise by the first reciprocating gear 36, and a third gear 18 rotates clockwise by the second gear 16. An automatic paper feed roller gear 20 rotates counterclockwise by the third gear 18, and a first idle gear 24 rotates clockwise by the automatic paper feed roller gear 20. A second idle gear 22 rotates counterclockwise by the first idle gear 24. The second idle gear 22 transmits the clockwise rotation required for the transmission roller gear interlocked therewith so as to rotate the transmission roller and thereby transport the document to be transmitted. As shown in FIG. 4, the driving gear 10 rotates counterclockwise, and a second reciprocating gear 48 rotates by a lever 28 and a second link 38 according to the position of the cam gear 30 so that it is interlocked with a fourth gear 40. Due to the counterclockwise rotation of the central gear 14, the second reciprocating gear 48 rotates clockwise. The second reciprocating gear 48 rotates the fourth gear 40 counterclockwise. The fourth gear 40 rotates a fifth gear 42 clockwise, which then rotates a sixth gear 44 counterclockwise. The sixth gear 44 provides the clockwise rotation referred for the reception roller gear interlocked therewith so that paper is transported to complete the copying operation.

As shown in FIG. 5, in step 502, the back mode is entered and in step 504 the motor is rotated clockwise while in step 506 the number of rotations of the motor is counted.

In step 508, a determination is made as to whether the sensor is on and if so, in step 510, a determination is made as to whether the number of steps counted in step 506 is greater or equal to 100.

If so, the motor is rotated in a clockwise direction in step 512 and the motor is again rotated clockwise instep 514.

Figure 6:
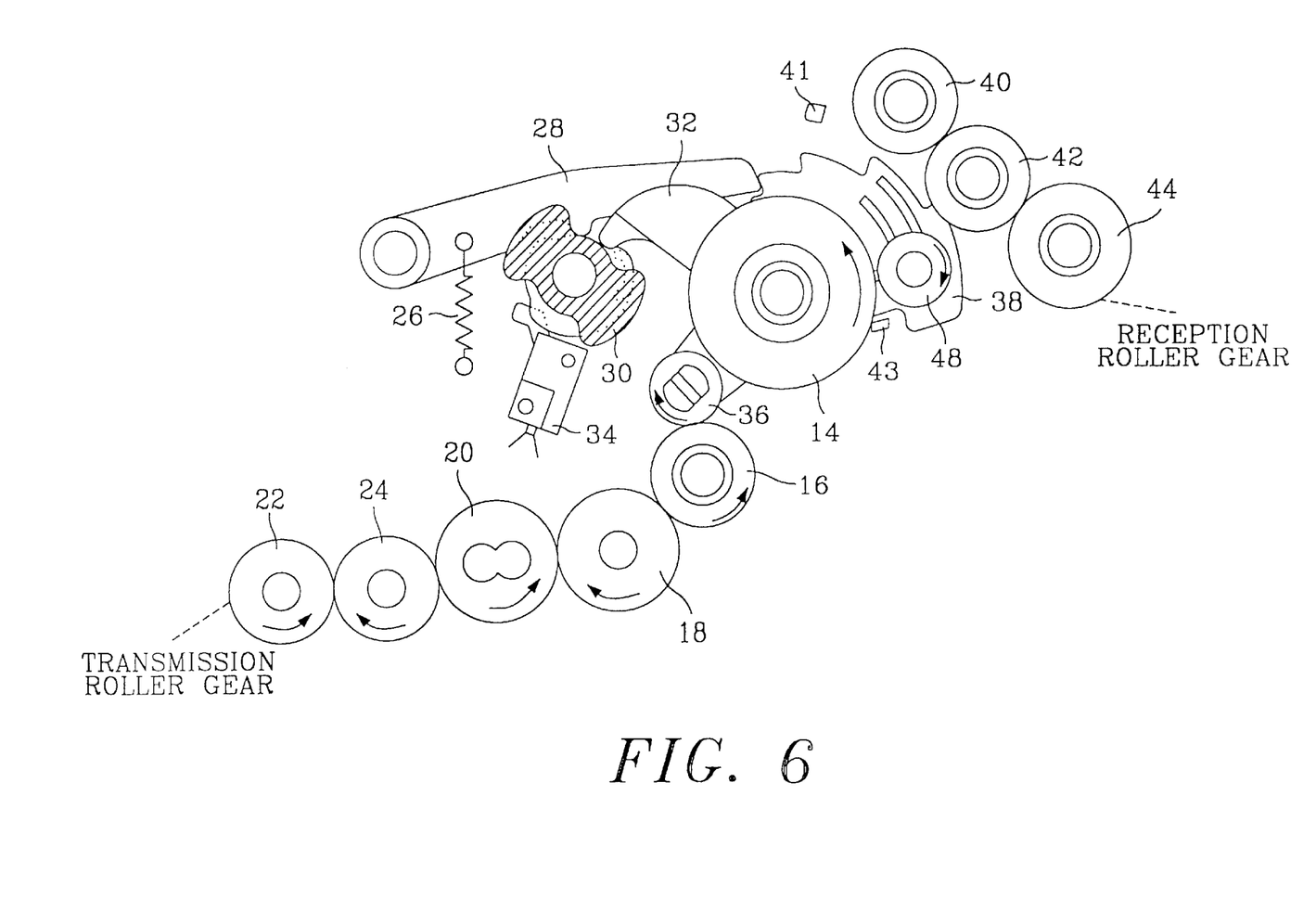
FIG. 6 shows the rotation states of various gears in the document transporting mode of operation of the facsimile machine shown in FIG. 1.
Figure 7:
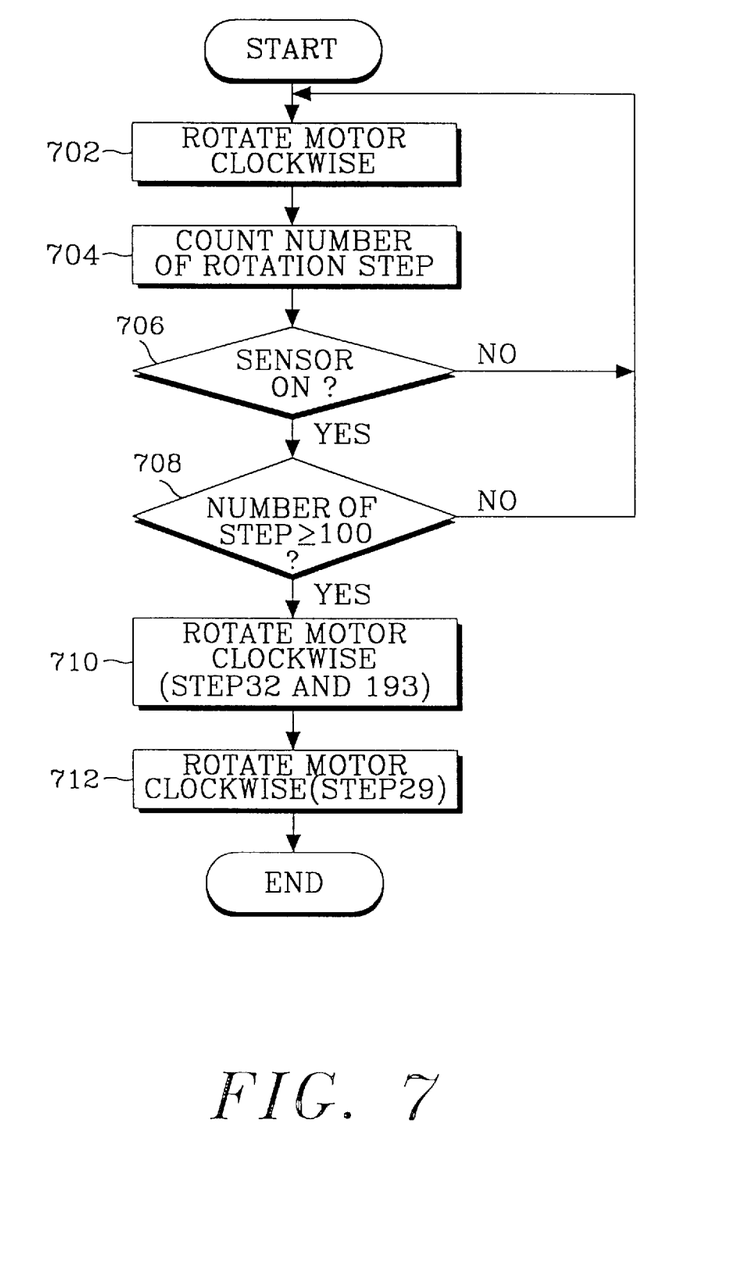
FIG. 7 is a flowchart of the document transporting mode of operation of the facsimile machine shown n FIG. 1.

FIG. 6 shows that the various gears of the facsimile are driven in a mode which drives the transmission roller during the document transmission. FIG. 7 is a flowchart illustrating the process through which the gears of the facsimile machine are driven as shown in FIGS. 3 and 6.

Referring to FIGS. 1, 2 and 3, the driving gear 10 rotates clockwise by the driving force of the step motor 11, and the first gear 12 rotates counterclockwise by the driving gear 10. The central gear 14 rotates clockwise by the first gear 12. The first reciprocating gear 36 rotates clockwise to interlock the cam gear 30, and simultaneously stops and rotates counterclockwise. The cam gear 30 rotates clockwise by the first reciprocating gear 36. The sensor cam 54 stalled at the lower end of the cam gear 30 rotates as shown in FIG. 3 so that the sensor 34 determines the initial location of the cam gear 30. Other gears and the second link 38 do not rotate any more by the second stop 43 so that they are fixed as shown in FIG. 6.

Referring to FIGS. 6 and 7, the central gear 14 rotates counterclockwise by the reverse (counterclockwise) rotation of the driving gear 10. The first reciprocating gear 36 rotates clockwise by the central gear 14, and the second gear 16 rotates counterclockwise by the first reciprocating gear 36. The third gear 18 rotates clockwise by the second gear 16, and the automatic paper feed roller gear 20 rotates counterclockwise by the third gear 18. The first idle gear 24 rotates clockwise by the automatic paper feed roller gear 20. The second idle gear 22 rotates counterclockwise by the first idle gear 24. The second idle gear 22 transmits the clockwise rotation required for the transmission roller gear interlocked therewith so as to rotate the transmission roller and thereby transport the document to be transmitted.

In FIG. 7, the motor is rotated clockwise in step 702 and the number of rotation steps of the motor is counted in step 704.

A determination is made in step 706 as to whether the sensor is on and if so, a determination is made in step 708 as to whether the number of steps counted in step 704 is greater or equal to 100.

If so, the motor is rotated clockwise in step 710 and then the motor is further rotated clockwise in step 712.

Figure 8:
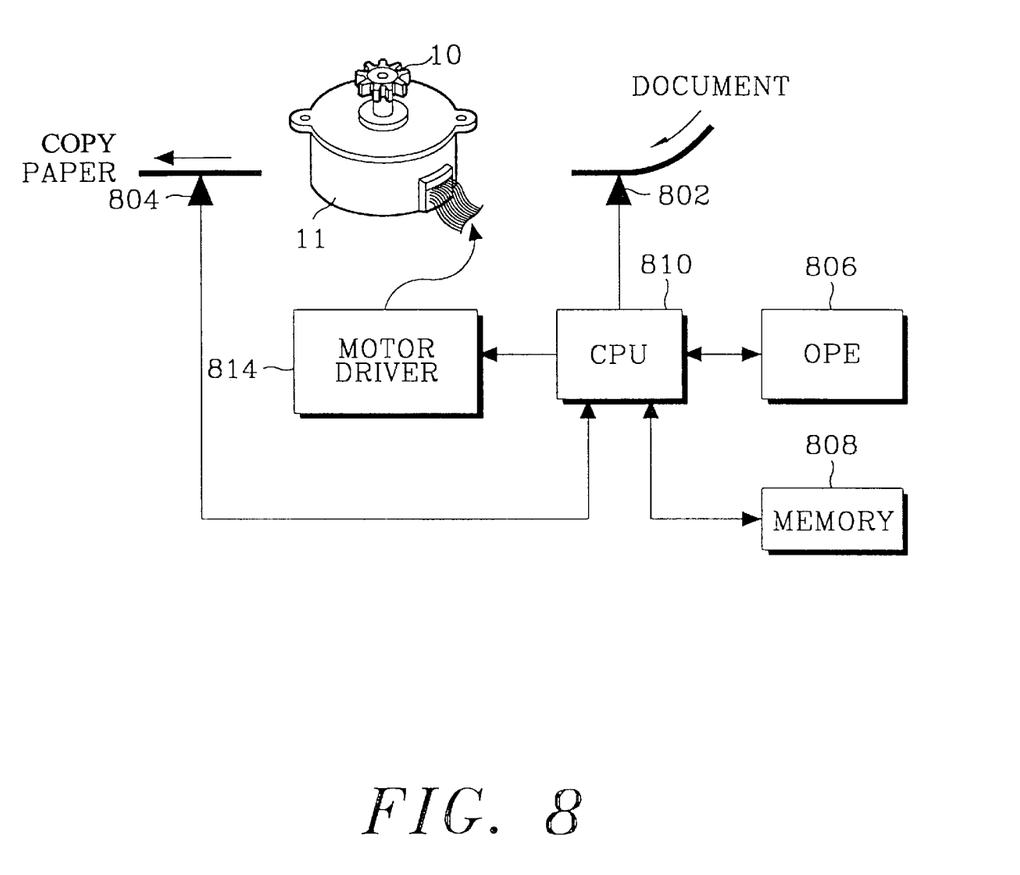
FIG. 8 shows the construction of a facsimile machine which controls the copying of multipage documents, according to the present invention.

FIG. 8 schematically shows the internal construction of the facsimile machine which performs multipage copying operation according to the present invention. In FIG. 8, a CPU 810 controls the multipage copying operation according to the flowchart depicted in FIGS. 9A and 9B. Specifically, the CPU 810 controls a motor driver 814 when it is confirmed by a second sensor 804 that the first page of the document has been copied, and when the second page is sensed by a first sensor 802. The step motor 11 is not changed into the document transmission mode but is maintained in the document copying mode.

Figure 9A:
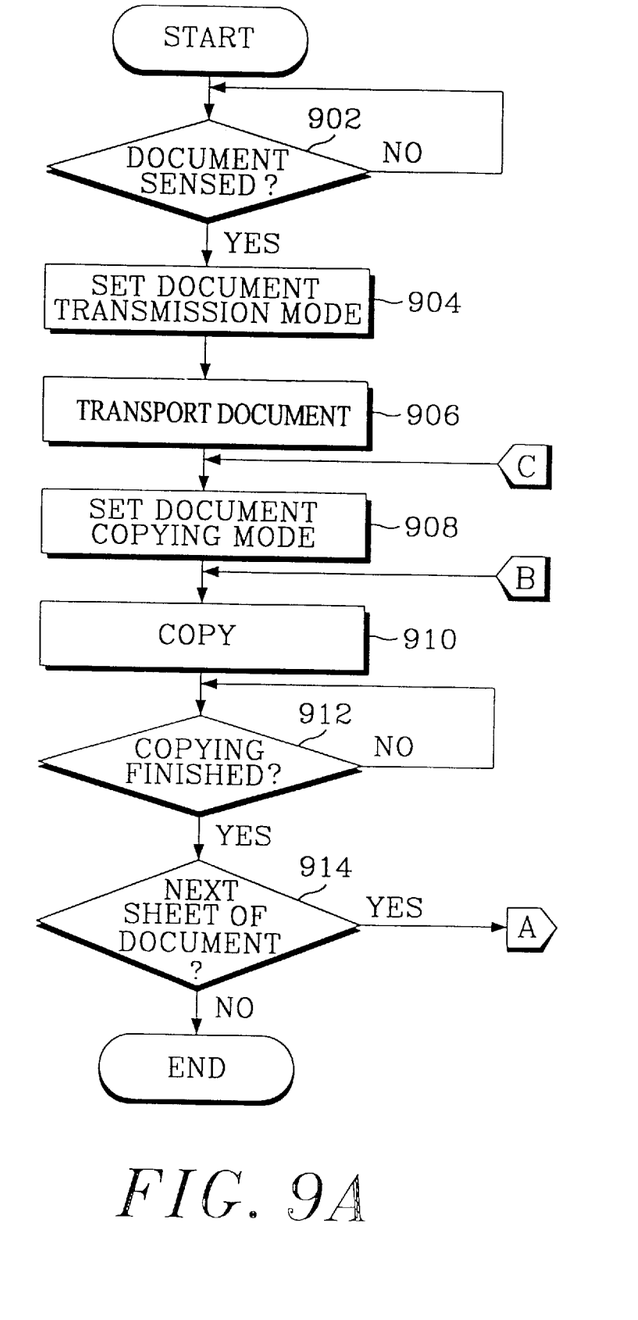
FIGS. 9A and 9B together form a flowchart of the multipage document copying operation according to the present invention.
Figure 9B:
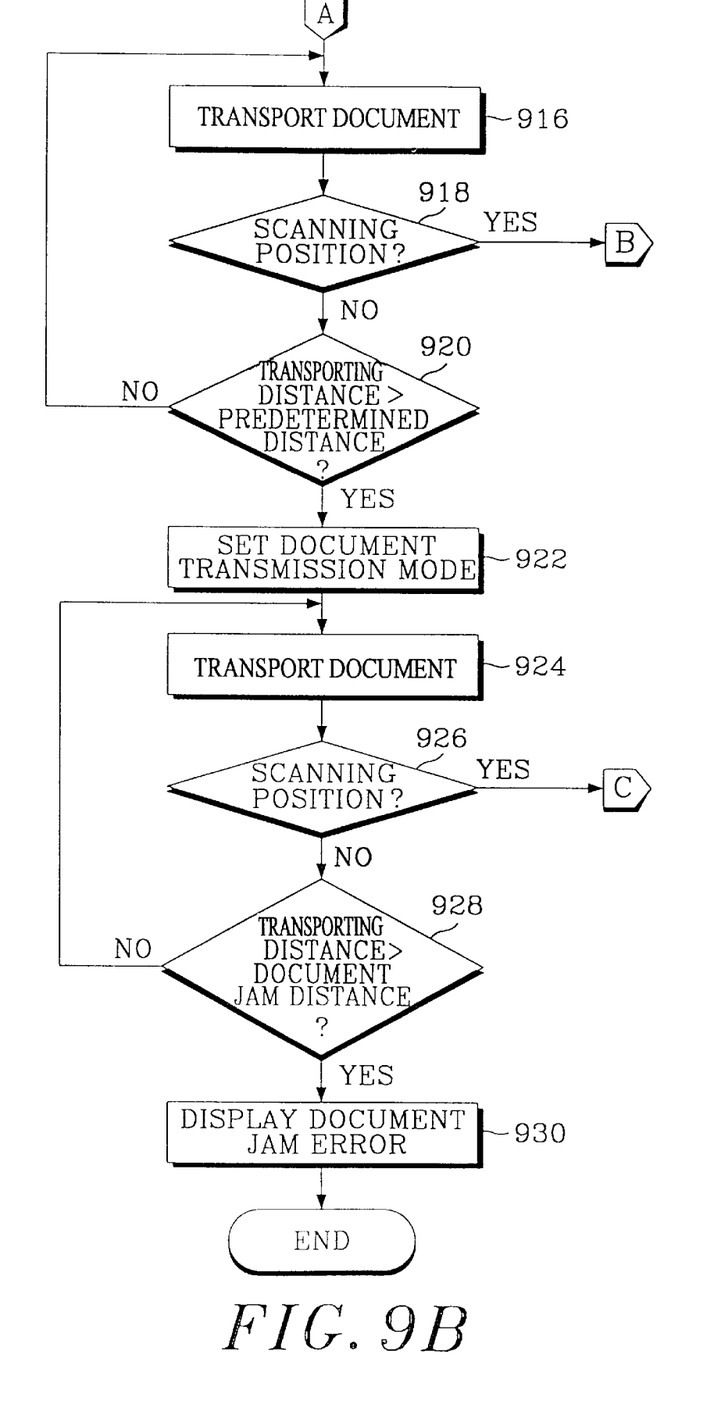

Referring to FIGS. 9A and 9B, the program is stored in a memory 808 of FIG. 8. The CPU 810 controls the multipage document copying operation according to the store program. When the first sensor 802 detects that the document to be copied is mounted oil the document feed roller in step 902, the CPU 810 controls a motor driver 814 in step 904 so that the gear mode is changed to the document transmission mode, and the first page of document is transported to the scanning position in step 906.

In step 908, he CPU 810 changes the gear mode into the copying mode, and it performs the copying of the document in step 910. In step 912, it is determined by the second sensor 804 whether or not the copying of the fist page of the document has been completed. The CPU 810 finishes the entire operation if it is confirmed in step 914 that there is no other document to be copied. If not, step 916 goes to control the motor driver 814 so that the next document is transported while the gear mode is in the copying mode. If it is confirmed in step 918 that the document has been transported to the scanning position, the procedure returns to step 910 to copy the transported document. If it is confirmed in step 918 that the transported document has not been removed to the scanning position, in step 920 a determination is made as to whether the distance currently transported is greater than a predetermined distance (between documents). If the currently transported distance is less than the predetermined distance, the procedure goes to back step 916 to continuously transport the document. If not, step 922 is performed to set the gear mode to the document transmission mode. After this process, the document is transported in step 924, and it is determined in step 926 whether the document has been transported to the scanning position. Here, if it is confirmed that the document has been transported to the scanning position, the procedure returns to step 908 so that the gear mode is changed to the copying mode and the copying operation is contiuously carried out.

If it is confirmed that the document has not been transported to the scanning position, in step 928 a determination is made as to whether the document is jammed. This is possible by comparing the transporting distance of the document with a predetermined document jam distance. If the document is not jammed, step 924 is carried out to move the document. If the document is jammed, in step 930 the document's jam error is displayed, for example, on an operating panel equipment OPE) 806 of FIG. 8.

Turning to FIGS. 9A and 9B again, the multipage document copying operation of the present invention can be roughly divided into three parts.

The first part corresponds to steps 902 to 912. When a predetermined document is mounted on the document feed roller, this roller starts so that image information written on the document is scanned by the scanner. At the same time, the paper feed roller starts to print the image information scanned by the scanner on a sheet of paper to copy the document.

The second part includes steps 914 to 920. If the next document is mounted on the document feed roller, it is moved to the scanning position in the scanner to perform the copying of the transported document.

The third part corresponds to the second part. If the next document is not transported to the scanning position but the transporting distance of the document is greater than the predetermined distance, the paper feed roller stops, and only the document feed roller is continuously driven to transport the next document to the scanning position. Besides the above-described operations, the present invention further performs the following operation. In the third part, if the transporting distance of the next document is less than a predetermined document jam distance and the next document is moved to the scanning position, the paper feed roller restarts to copy the document (in steps 924 to 928). If the document is not transported to the scanning position but the transporting distance of the next document to be transported in the third part is greater than the document jam distance, an error process is further performed in step 930.

As described above, the present invention enables a multipage document to be continuously copied in the copying mode without the gear mode being changed to the transmission mode, thereby reducing the time to copy. In addition, the present invention can process a jammed document possibly caused during multipage copying.

It should be understood that various modifications of the present invention are possible without departing from the scope of the present invention. For instance, the present invention can be applied to a facsimile machine having at least a document feed roller and paper feed roller, as well as to the facsimile machine having one motor. Therefore, the scope of the present invention should not be limited to the embodiments described above but to the scope of the following claims and their equivalents.

What is claimed is:

1. A method of copying a multipage document comprising:

providing a document feed roller for transporting sheets of a document, a scanner for scanning image information written on the document sheets transported by the document feed roller, a paper feed roller for transporting sheets of paper on which the image information read by the scanner is printed, and a central processing hit for controlling their operations;

starting the document feed roller when a predetermined sheet of the multipage document is mounted at a scanning position so that image information written on the document is scanned by the scanner, and at the same time, starting the paper feed roller to print the image information scanned by the scanner on a sheet of paper so as to copy the sheet of the document;

moving a next sheet of the multipage document to the scanning position in the scanner if it is mounted on the document feed roller, to perform the copying of the transported document sheet; and stopping the paper feed roller, and continuously driving only the document feed roller to transport the next sheet of the document to the scanning position if it has not been transported to the scanning position and the transporting distance of the sheet of the document is greater than a predetermined distance.

2. The method as claimed in claim 1, further comprising the step of restarting the paper feed roller to copy the sheet of the document if the transporting distance of the next document sheet is less than a predetermined document jam distance and the next document sheet is moved to the scanning position.

3. The method as claimed in claim 1, further comprising the step of performing an error process if the document sheet is not transported to the scanning position and the transporting distance of the next document sheet to be transported in the document transporting step is greater than a predetermined document jam distance.

4. An apparatus for copying a multipage document, the apparatus comprising:

a document feed roller for transporting sheets of a document;

a scanner for scanning image information written on the document sheets transported by the document feed roller;

a paper feed roller for transporting sheets of paper on which the image information read by the scanner is printed, a central processing unit for controlling said rollers and said scanner;

said cental processing unit starting the document feed roller when a predetermined sheet of the multipage document is mounted at a scanning position so that image information written on the document is scanned by said scanner, and at the same time, starting the paper feed roller to print the image information scanned by said scanner on a sheet of paper so as to copy the sheet of the document;

said central processing unit moving a next sheet of the multipage document to the scanning position in said scanner if it is mounted on the document feed roller, to perform the copying of the transported document sheet; and said cental processing unit stopping the paper feed roller, and continuously driving only the document feed roller to transport the next sheet of the document to the scanning position if it has not been transported to the scanning position and the transporting distance of the sheet of the document is greater than a predetermined distance.

5. The apparatus as claimed in claim 4, said central processing unit restarting the paper feed roller to copy the sheet of the document if the transporting distance of the next document sheet is less than a predetermined document jam distance and the next document sheet is moved to the scanning position.

6. The apparatus as claimed in claim 4, said central processing unit performing an error process if the document sheet is not transported to the scanning position and the transporting distance of the next document sheet to be transported in the document transporting step is greater than a predetermined document jam distance.

* * * * *